(12) United States Patent
Deng et al.

(10) Patent No.: US 11,793,165 B2
(45) Date of Patent: *Oct. 24, 2023

(54) SYSTEMS AND METHODS FOR MONITORING ORGANISMS WITHIN AN AQUATIC ENVIRONMENT

(71) Applicant: Battelle Memorial Institute, Richland, WA (US)

(72) Inventors: Z. Daniel Deng, Richland, WA (US); Huidong Li, Richland, WA (US); Mitchell J. Myjak, Richland, WA (US); Jun Lu, Richland, WA (US); Jayson J. Martinez, Kennewick, WA (US); Jiguang Zhang, Richland, WA (US); Samuel S. Cartmell, Richland, WA (US); Yuxing Wang, Richland, WA (US); Qiuyan Li, Richland, WA (US); Jie Xiao, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/726,574

(22) Filed: Dec. 24, 2019

(65) Prior Publication Data

US 2020/0137980 A1 May 7, 2020

Related U.S. Application Data

(63) Continuation of application No. 15/393,617, filed on Dec. 29, 2016, now Pat. No. 10,531,639.

(Continued)

(51) Int. Cl.
*A01K 61/95* (2017.01)
*H04B 1/3827* (2015.01)
(Continued)

(52) U.S. Cl.
CPC ............ *A01K 11/006* (2013.01); *A01K 61/95* (2017.01); *H04B 1/385* (2013.01); *H04B 11/00* (2013.01); *B06B 1/0655* (2013.01)

(58) Field of Classification Search
CPC ...... A01K 11/00; A01K 11/006; A01K 61/95; H04B 1/3827; H04B 11/00; H04B 1/385; B06B 1/0655
See application file for complete search history.

(56) References Cited

U.S. PATENT DOCUMENTS 2,775,939 A  1/1957 Fogal
3,100,886 A  8/1963 Marks
(Continued)

FOREIGN PATENT DOCUMENTS

CA  2091043  9/1994
CN  1424592  6/2003
(Continued)

OTHER PUBLICATIONS

Johannesson; NPL (Fisheries Acoustics—A Practical Manual for Aquatic Biomass Estimation; FAO—Food and Agriculture Organization of the United Nations Rome, 1983) (Year: 1983).*

(Continued)

*Primary Examiner* — Daniel L Murphy
*Assistant Examiner* — Amie M Ndure
(74) *Attorney, Agent, or Firm* — Wells St. John P.S.

(57) ABSTRACT

Systems and methods for monitoring organisms within an aquatic environment are described. According to one aspect, an injectable acoustic transmission device includes a body configured to be injected inside of an organism, a transducer within the body and configured to convert a plurality of electrical signals into a plurality of data transmissions which are transmitted externally of the body and the organism, a plurality of circuit components within the body and config- (Continued)

ured to use electrical energy from a power source to generate the electrical signals which are provided to the transducer, and wherein the transducer defines an internal volume and at least one of the circuit components is provided within the internal volume of the transducer.

20 Claims, 6 Drawing Sheets

Related U.S. Application Data

(60) Provisional application No. 62/379,473, filed on Aug. 25, 2016.

(51) Int. Cl.
*H04B 11/00* (2006.01)
*B06B 1/06* (2006.01)
*A01K 11/00* (2006.01)

(56) References Cited

U.S. PATENT DOCUMENTS

| | | | |
|---|---|---|---|
| 3,262,093 A | 7/1966 | Junger et al. |
| 3,292,303 A | 12/1966 | Fors |
| 3,311,830 A | 3/1967 | Skirvin |
| 3,576,732 A | 4/1971 | Weidinger et al. |
| 3,713,086 A | 1/1973 | Trott |
| 4,042,845 A | 8/1977 | Hackett |
| 4,241,535 A | 12/1980 | Tsukuda |
| 4,259,415 A | 3/1981 | Tamura et al. |
| 4,336,709 A | 6/1982 | Meek |
| 4,353,004 A | 10/1982 | Kleinschmidt |
| 4,392,236 A | 7/1983 | Sandstrom et al. |
| 4,679,559 A | 7/1987 | Jefferts |
| 4,762,427 A | 8/1988 | Hori et al. |
| 4,790,090 A | 12/1988 | Sharber |
| 4,970,988 A | 11/1990 | Heisey |
| 4,986,276 A | 1/1991 | Wright |
| 5,177,891 A | 1/1993 | Holt |
| 5,211,129 A | 5/1993 | Taylor et al. |
| 5,324,940 A | 6/1994 | Ekstrom |
| 5,344,357 A | 9/1994 | Lyczek |
| 5,517,465 A | 5/1996 | Nestler et al. |
| 5,675,555 A | 10/1997 | Evans et al. |
| 5,697,384 A | 12/1997 | Miyawaki et al. |
| 5,857,881 A | 1/1999 | Zippel, Sr. |
| 5,974,304 A | 10/1999 | Chen |
| 5,995,451 A | 11/1999 | Evans et al. |
| 6,021,731 A | 2/2000 | French et al. |
| 6,201,766 B1 | 3/2001 | Carlson et al. |
| 6,662,742 B2 | 12/2003 | Shelton et al. |
| 6,689,056 B1 | 2/2004 | Kilcoyne et al. |
| 6,712,772 B2 | 3/2004 | Cohen et al. |
| 6,766,950 B2 | 7/2004 | Hall |
| 6,904,798 B2 | 6/2005 | Boucher et al. |
| 6,928,765 B2 | 8/2005 | Brickett |
| 7,016,260 B2 | 3/2006 | Baray |
| 7,289,931 B2 | 10/2007 | Ebert |
| 7,457,720 B2 | 11/2008 | Ebert |
| 8,032,429 B2 | 10/2011 | Shafer |
| 8,033,890 B2 | 10/2011 | Warner et al. |
| 8,360,327 B2 | 1/2013 | Clarke |
| 8,448,592 B2 | 5/2013 | Crowell et al. |
| 8,564,985 B2 | 10/2013 | van Straaten |
| 8,922,373 B2 | 12/2014 | Michelson |
| 9,266,591 B2 | 2/2016 | Lu |
| 9,453,854 B2 | 9/2016 | Kraige et al. |
| 9,526,228 B2 | 12/2016 | Fraser et al. |
| 10,033,469 B2 | 7/2018 | Deng et al. |
| 10,033,470 B2 | 7/2018 | Deng et al. |
| 10,067,112 B2 | 9/2018 | Deng et al. |
| 10,101,429 B2 | 10/2018 | Deng et al. |
| 10,236,920 B2 | 3/2019 | Deng et al. |
| 10,452,143 B2 | 10/2019 | Moon et al. |
| 10,531,639 B2 | 1/2020 | Deng et al. |
| 10,739,434 B2 | 8/2020 | Deng et al. |
| 10,935,536 B2 | 3/2021 | Deng et al. |
| 11,104,404 B2 | 8/2021 | Wienders |
| 11,139,840 B2 | 10/2021 | Deng et al. |
| 11,278,004 B2 | 3/2022 | Deng et al. |
| 11,381,263 B2 | 7/2022 | Deng et al. |
| 11,533,818 B2 | 12/2022 | Deng et al. |
| 2003/0034887 A1 | 2/2003 | Crabtree et al. |
| 2003/0085684 A1 | 5/2003 | Tsukamoto et al. |
| 2003/0117893 A1 | 6/2003 | Baray |
| 2003/0128847 A1 | 7/2003 | Smith |
| 2004/0133081 A1 | 7/2004 | Teller et al. |
| 2004/0220856 A1 | 11/2004 | Moore |
| 2005/0158246 A1 | 7/2005 | Takizawa et al. |
| 2006/0218374 A1 | 9/2006 | Ebert |
| 2007/0083119 A1 | 4/2007 | Adachi et al. |
| 2007/0088194 A1 | 4/2007 | Tahar et al. |
| 2007/0103314 A1 | 5/2007 | Geissler |
| 2007/0171012 A1 | 7/2007 | Fujimori et al. |
| 2007/0288160 A1 | 12/2007 | Ebert |
| 2008/0174409 A1 | 7/2008 | Frank |
| 2008/0269614 A1 | 10/2008 | Adachi et al. |
| 2009/0073802 A1 | 3/2009 | Nizzola et al. |
| 2009/0079368 A1 | 3/2009 | Poppen et al. |
| 2009/0182426 A1 | 7/2009 | Von Arx et al. |
| 2009/0188320 A1 | 7/2009 | Greenough et al. |
| 2009/0306633 A1 | 12/2009 | Trovato et al. |
| 2011/0077659 A1 | 3/2011 | Mandecki et al. |
| 2011/0105829 A1 | 5/2011 | Ball |
| 2011/0163857 A1 | 7/2011 | August et al. |
| 2011/0181399 A1 | 7/2011 | Pollack et al. |
| 2011/0254529 A1 | 10/2011 | van Straaten |
| 2012/0134239 A1* | 5/2012 | Struthers ............... H04B 1/034 367/137 |
| 2012/0277550 A1 | 11/2012 | Rosenkranz et al. |
| 2013/0012865 A1 | 1/2013 | Sallberg et al. |
| 2013/0181839 A1 | 7/2013 | Cao |
| 2013/0237774 A1 | 9/2013 | Schentag et al. |
| 2013/0324059 A1 | 12/2013 | Lee et al. |
| 2014/0005758 A1 | 1/2014 | Ben-Yehuda et al. |
| 2014/0142556 A1 | 5/2014 | Kuo et al. |
| 2014/0211594 A1 | 7/2014 | Allen et al. |
| 2015/0063072 A1* | 3/2015 | Deng .................... B06B 1/0655 367/134 |
| 2015/0241463 A1 | 8/2015 | Kraige et al. |
| 2015/0241566 A1 | 8/2015 | Chakraborty et al. |
| 2015/0289479 A1* | 10/2015 | Allen ..................... G01S 5/18 367/135 |
| 2015/0351365 A1 | 12/2015 | Claver Tallon et al. |
| 2016/0104355 A1 | 4/2016 | Alexander et al. |
| 2016/0211924 A1 | 7/2016 | Deng et al. |
| 2016/0245894 A1 | 8/2016 | Deng et al. |
| 2017/0089878 A1 | 3/2017 | Deng et al. |
| 2017/0164581 A1 | 6/2017 | Deng et al. |
| 2017/0170850 A1 | 6/2017 | Deng et al. |
| 2018/0055007 A1 | 3/2018 | Deng |
| 2019/0018100 A1 | 1/2019 | Deng et al. |
| 2019/0056372 A1 | 2/2019 | Deng et al. |
| 2019/0103888 A1 | 4/2019 | Deng et al. |
| 2019/0250290 A1 | 8/2019 | Oeverland |
| 2020/0079475 A1 | 3/2020 | Wienders |
| 2020/0296854 A1 | 9/2020 | Deng et al. |

FOREIGN PATENT DOCUMENTS

| | | |
|---|---|---|
| CN | 101714207 | 5/2010 |
| CN | 102568463 | 7/2012 |
| CN | 102598716 | 7/2012 |
| CN | 202414143 | 9/2012 |
| CN | 102754249 | 10/2012 |
| EP | 2037396 A1 | 3/2009 |
| EP | 1705500 B1 | 6/2010 |
| GB | 1195633 A | 6/1970 |
| GB | 2188028 A | 9/1987 |
| JP | 61-291294 | 12/1986 |
| WO | WO 95/03691 | 2/1995 |

(56) References Cited

FOREIGN PATENT DOCUMENTS

| WO | WO 2011/068825 | 6/2011 |
|---|---|---|
| WO | WO 2011/079338 | 7/2011 |
| WO | WO 2015/031853 | 3/2015 |

OTHER PUBLICATIONS

Deng, NPL (An injectable acoustic transmitter for juvenile salmon; Jan. 29, 2015) (Year: 2015).*

CN, CN 2014800479315 Search Rept, dated Jul. 26, 2017, Battelle Memorial Institute.

CN, CN 2015800768080 Search Rept, dated Nov. 21, 2019, Battelle Memorial Institute.

WO, PCT/US2014/053578 Inv. Pay Fee, dated Dec. 5, 2014, Battelle Memorial Institute.

WO, PCT/US2014/053578 IPRP, Mar. 1, 2016, Battelle Memorial Institute.

WO, PCT/US2014/053578 Search Rept., dated Mar. 5, 2015, Battelle Memorial Institute.

WO, PCT/US2014/053578 Writ. Opin., dated Mar. 5, 2015, Battelle Memorial Institute.

WO, PCT/US2015/062200 IPRP, Aug. 29, 2017, Battelle Memorial Institute.

WO, PCT/US2015/062200 Search Rept., dated Feb. 24, 2016, Battelle Memorial Institute.

WO, PCT/US2015/062200 Writ. Opin., dated Feb. 24, 2016, Battelle Memorial Institute.

WO, PCT/US2016/054981 IPRP, Sep. 19, 2018, Battelle Memorial Institute.

WO, PCT/US2016/054981 Search Rept., dated Nov. 18, 2016, Battelle Memorial Institute.

WO, PCT/US2016/054981 Writ. Opin., dated Nov. 18, 2016, Battelle Memorial Institute.

WO, PCT/US2016/055045 IPRP, Jun. 19, 2018, Battelle Memorial Institute.

WO, PCT/US2016/055045 Search Rept., dated Feb. 7, 2017, Battelle Memorial Institute.

WO, PCT/US2016/055045 Writ. Opin., dated Feb. 7, 2017, Battelle Memorial Institute.

WO, PCT/US2017/038082 Inv Pay Fees, dated Sep. 15, 2017, Battelle Memorial Institute.

WO, PCT/US2017/038082 IPRP, Feb. 26, 2019, Battelle Memorial Institute.

WO, PCT/US2017/038082 Search Rept., dated Nov. 20, 2017, Battelle Memorial Institute.

WO, PCT/US2017/038082 Writ. Opin., dated Nov. 20, 2017, Battelle Memorial Institute.

Aktakka et al., "Energy Scavenging from Insect Flight", Journal of Micromechanics and Microengineering vol. 21, 095016, 2011, United Kingdom, 10 pages.

Brown et al., "An Evaluation of the Maximum Tag Burden for Implantation of Acoustic Transmitters in Juvenile Chinook Salmon", North American Journal of Fisheries Management vol. 30, 2010, United States, pp. 499-505.

Cha et al., "Energy Harvesting from a Piezoelectric Biomimetic Fish Tail", Renewable Energy vol. 86, Feb. 2016, Netherlands, pp. 449-458.

Cha et al., "Energy Harvesting from the Tail Beating of a Carangiform Swimmer using Ionic Polymer-Metal Composites", Bioinspiration and Biomimetics vol. 8, 2013, United Kingdom, 15 pages.

Cook et al., "A Comparison of Implantation Methods for Large PIT Tags or Injectable Acoustic Transmitters in Juvenile Chinook Salmon", Fisheries Research vol. 154, 2014, Netherlands, pp. 213-223.

Dagdeviren et al., "Conformal Piezoelectric Energy Harvesting and Storage from Motions of the Heart, Lung, and Diaphragm", Proceedings of the National Academy of Sciences of the United States of America vol. 111, 2014, United States, pp. 1927-1932.

Deng et al., "A Cabled Acoustic Telemetry System for Detecting and Tracking Juveniie Salmon: Part 2. Three-Dimensional Tracking and Passage Outcomes", Sensors vol. 11, 2011, Switzerland, pp. 5661-5676.

Deng et al., "An Injectable Acoustic Transmitter for Juvenile Salmon", Scientific Reports, Jan. 29, 2015, United Kingdom, 6 pages.

Deng et al., "Design and Instrumentation of a Measurement and Calibration System for an Acoustic Telemetry System", Sensors vol. 10, 2010, Switzerland, pp. 3090-3099.

Deng et al., U.S. Appl. No. 62/267,738, filed Dec. 15, 2015, titled "Transmitters for Animals and Methods for Transmitting from Animals", 42 pages.

Deng et al., U.S. Appl. No. 62/267,797, filed Dec. 15, 2015, titled "Signal Transmitter and Methods for Transmitting Signals from Animals", 34 pages.

Eppard, "Juvenile Salmon Acoustic Telemetry System JSATS", Dec. 14, 2011, URL: http://www.nwcouncil.org/media/23478/jsats.pdf, pp. 1-13.

Erturk et al., "Underwater Thrust and Power Generation Using Flexible Piezoelectric Composites: An Experimental Investigation Toward Self-Powered Swimmer-Sensor Platforms", Smart Materials and Structures vol. 20, 125013, 2011, United Kingdom, 11 pages.

Hwang et al., "Self-Powered Cardiac Pacemaker Enabled by Flexible Single Crystalline PMN-PT Piezoelectric Energy Harvester", Advanced Materials vol. 26, 2014, Germany, pp. 4880-4887.

Hwang et al., "Self-Powered Deep Brain Stimulation via a Flexible PIMNT Energy Harvester", Energy and Environmental Science vol. 8, 2015, United Kingdom, pp. 2677-2684.

Lam et al., "Physical Characteristics and Rate Performance of $(CFx)n$ ($0.33<x<0.66$) in Lithium Batteries", Journal of Power Sources vol. 153, 2006, Netherlands, pp. 354-359.

Li et al., "Design Parameters of a Miniaturized Piezoelectric Underwater Acoustic Transmitter", Sensors vol. 12, 2012, Switzerland, pp. 9098-9109.

Li et al., "Energy Harvesting from Low Frequency Applications using Piezoelectric Materials", Applied Physics Reviews 1, 041301, 2014, United States, 20 pages.

Li et al., "Piezoelectric Materials Used in Underwater Acoustic Transducers" Sensor Letters vol. 10 (3/4), 2012, United States, pp. 679-697.

Li et al., "Piezoelectric Transducer Design for a Miniaturized Injectable Acoustic Transmitter", Smart Materials and Structures vol. 24, 115010, 2015, United Kingdom, 9 pages.

McMichael et al., "The Juvenile Salmon Acoustic Telemetry System: A New Tool", Fisheries vol. 35, No. 1, Jan. 1, 2010, United States, pp. 9-22.

Meduri et al., "Hybrid $CVx$-$Ag_2VO_{11}$ as a High-Energy, Power Density Cathode for Application in an Underwater Acoustic Microtransmitter", Electrochemistry Communications vol. 13, 2011, United States, pp. 1344-1348.

Ritchie et al., "Further Developments of Lithium/Polycarbon Monofluoride Envelope Cells", Journal of Power Sources vol. 96, 2001, Netherlands, pp. 180-183.

Rub et al., "Comparative Performance of Acoustic-Tagged and Passive Integrated Transponder-Tagged Juvenile Salmonids in the Columbia and Snake Rivers", U.S. Army Corps of Engineers, Portland District, Portland Oregon, 2007, United States, 163 pages.

S.M. Corporation, "Macro Fiber Composite—MFC" Smart Material Brochure, 2015, United States, 8 pages.

Shafer, "Energy Harvesting and Wildlife Monitoring", available online at http://www.ofwim.org/wp-content/uploads/2014/11/ Shafer_keynote.pdf, 2014, 36 pages.

Weiland et al., "A Cabled Acoustic Telemetry System for Detecting and Tracking Juvenile Salmon: Part 1. Engineering Design and Instrumentation", Sensors vol. 11, No. 12, Dec. 26, 2011, Switzerland, pp. 5645-5660.

Yazami et al., "Fluorinated Carbon Nanofibres for High Energy and High Power Densities Primary Lithium Batteries", Electrochemistry Communications vol. 9, 2007, Netherlands, pp. 1850-1855.

(56) References Cited

OTHER PUBLICATIONS

Zhang et al., "Enhancement of Discharge Performance of Li/CFx Cell by Thermal Treatment of CFx Cathode Material", Journal of Power Sources vol. 188, 2009, Netherlands, pp. 601-605.
Adams et al., "Effects of Surgically and Gastrically Implanted Radio Transmitters on Swimming Performance and Predator Avoidance of Juvenile Chinook Salmon (*Oncorhynchus tshawytscha*)", Canadian Journal of Fisheries and Aquatic Sciences 55, 1998, Canada, pp. 781-787.
Anglea et al., "Effects of Acoustic Transmitters on Swimming Performance and Predator Avoidance of Juvenile Chinook Salmon", North American Journal of Fisheries Management 24, 2004, United States, pp. 162-170.
Atlantic States Marine Fisheries Commission, "American Eel Benchmark Stock Assessment Report No. 12-01", May 2012, United States, 340 pages.
Bams, "Differences in Performance of Naturally and Artificially Propagated Sockeye Salmon Migrant Fry, as Measured With Swimming and Predation Tests", Journal of the Fisheries Board of Canada 24(5), 1967, Canada, pp. 1117-1153.
Barbin et al., "Behaviour and Swimming Performance of Elvers of the American Eel, *Anguilla rostrata*, in an Experimental Flume", Journal of Fish Biology 45, 1994, United Kingdom, pp. 111-121.
Biopack Systems, Inc. Hardware Guide, 2013, 152 pages.
Boubee et al., "Downstream Passage of Silver Eels at a Small Hydroelectric Facility", Fisheries Management and Ecology vol. 13, 2006, United Kingdom, pp. 165-176.
Brett, "The Respiratory Metabolism and Swimming Performance of Young Sockeye Salmon", Journal of the Fisheries Board of Canada 21(5), 1964, Canada, pp. 1183-1226.
Brown et al., "Evidence to Challenge the "2% Rule" for Biotelemetry", North American Journal of Fisheries Management 19, 1999, United States, pp. 867-871.
Brown et al., "Survival of Seaward-Migrating PIT and Acoustic-Tagged Juvenile Chinook Salmon in the Snake and Columbia Rivers: An Evaluation of Length-Specific Tagging Effects", Animal Biotelemetry 1:8, 2013, United States, 13 pages.
Brown, "Design Considerations for Piezoelectric Polymer Ultrasound Transducers", IEEE Transactions on Ultrasonics, Ferroelectrics, and Frequency Control vol. 47, No. 6, Nov. 2000, United States, pp. 1377-1396.
Brown, "Power Sources and Supplies", ISBN 978-7-5124-1052-7, Oct. 2013, China, 5 pages plus English translation.
Brown, "The Effects of Material Selection for Backing and Wear Protection/Quarter-Wave Matching of Piezoelectric Polymer Ultrasound Transducers", IEEE Ultrasonics Symposium, 2000, United States, pp. 1029-1032.
Butler et al., "A Tri-Modal Directional Modem Transducer", Oceans 2003 MTS/IEEE Conference, Sep. 22-26, 2003, United States, pp. 1554-1560.
Cada, "The Development of Advanced Hydroelectric Turbines to Improve Fish Passage Survival", Fisheries vol. 26, No. 9, Sep. 2001, United States, pp. 14-23.
Carlson et al., "Juvenile Salmon Acoustic Telemetry System Transmitter Downsize Assessment", Pacific Northwest National Laboratory, Richland, WA, 2010, United States, 30 pages.
Carlson et al., "Sensor Fish Characterization of Spillway Conditions at Ice Harbor Dam in 2004, 2005 and 2006", PNWD-3839 Final Report, Mar. 2008, United States, 95 pages.
Carlson et al., "The Sensor Fish—Making Dams More Salmon-Friendly", Sensors Online, Jul. 2004, United States, 7 pages.
China Electrical Appliance Industrial Institute, Editor of "Electrical and Electronic Technologies", Collection of Translations of Articles in 1992 International Electrical and Electronic Academic Conference, Nov. 1993, China, p. 540 plus English translation.
Collins et al., "Intracoelomic Acoustic Tagging of Juvenile Sockeye Salmon: Swimming Performance, Survival, and Postsurgical Wound Healing in Freshwater and during a Transition to Seawater", Transactions of the American Fisheries Society 142, 2013, United States, pp. 515-523.

Cote et al., "Swimming Performance and Growth Rates of Juvenile Atlantic Cod Intraperitoneally Implanted with Dummy Acoustic Transmitters", North American Journal of Fisheries Management vol. 19, 1999, United States, pp. 1137-1141.
Counihan et al., "Influence of Externally Attached Transmitters on the Swimming Performance of Juvenile White Sturgeon", Transactions of the American Fisheries Society 128, 1999, United States, pp. 965-970.
Coutant, "Fish Behavior in Relation to Passage Through Hydropower Turbines: A Review", Transactions of the American Fisheries Society vol. 129, 2000, United States, pp. 351-380.
Deng et al., "Design and Implementation of a New Autonomous Sensor Fish to Support Advanced Hydropower Development", Review of Scientific Instruments vol. 85, 2014, United States, 6 pages.
Deng et al., "Evaluation of Fish-Injury Mechanisms During Exposure to Turbulent Shear Flow", Canadian Journal of Fisheries and Aquatic Sciences vol. 62, 2005, Canada, pp. 1513-1522.
Deng et al., "Six-Degree-of-Freedom Sensor Fish Design and Instrumentation", Sensors vol. 7, 2007, United States, pp. 3399-3415.
Deng et al., "Use of an Autonomous Sensor to Evaluate the Biological Performance of the Advanced Turbine at Wanapum Dam", Journal of Renewable and Sustainable Energy vol. 2, 2010, United States, 11 pages.
Deng et al., U.S. Appl. No. 16/351,373, filed Mar. 12, 2019, titled "Sensor Assemblies and Methods for Emulating Interaction of Entities Within Water Systems", 30 pages.
Dillon, "Use and Calibration of the Internal Temperature Indicator", Microchip Technology Inc. AN1333, 2010, United States, 12 pages.
Dinwoodie, "Dual Output Boost Converter", Texas Instruments Application Report SLUA288, available online at http://www.ti.com/lit/an/slua288/slua288.pdf, Apr. 2003, 9 pages.
El Rifai et al., "Modeling of Piezoelectric Tube Actuators", Dspace@MIT: Innovation in Manufacturing Systems and Technology (IMST), 2004, Singapore, 9 pages.
Fisheries and Oceans Canada (DFO), "Recovery Potential Assessment of American Eel (*Anguilla rostrata*) in Eastern Canada", Canadian Science Advisory Secretariat Science Advisory Report 2013/078, 2013, Canada, 65 pages.
Gallego-Juarez et al., "Experimental Study of Nonlinearity in Free Progressive Acoustic Waves in Air at 20 kHz", Journal de Physique, Colloques, 40 (C8), 1979, France, pp. 336-340.
Harnish et al., "A Review of Polymer-Based Water Conditioners for Reduction of Handling-Related Injury", Reviews in Fish Biology and Fisheries 21, 2011, Netherlands, pp. 43-49.
Janak et al., "The Effects of Neutrally Buoyant, Externally Attached Transmitters on Swimming Performance and Predator Avoidance of Juvenile Chinook Salmon", Transactions of the American Fisheries Society 141, 2012, United States, pp. 1424-1432.
Johnson et al., "A Digital Acoustic Recording Tag for Measuring the Response of Wild Marine Mammals to Sound", IEEE Journal of Oceanic Engineering vol. 28, No. 1, Jan. 2003, United States, pp. 3-12.
Kogan et al., "Acoustic Concentration of Particles in Piezoelectric Tubes: Theoretical Modeling of the Effect of Cavity Shape and Symmetry Breaking", The Journal of the Acoustical Society of America vol. 116, No. 4, 2004, United States, pp. 1967-1974.
Lewandowski et al., "In Vivo Demonstration of a Self-Sustaining, Implantable, Stimulated-Muscle-Powered Piezoelectric Generator Prototype", Annals of Biomedical Engineering vol. 37, No. 11, Nov. 2009, Netherlands, pp. 2390-2401.
Li et al., "Piezoelectric Materials used in Underwater Acoustic Transmitters", Sensor Letters vol. 10, 2012, United States, 65 pages.
MacGregor et al., "Recovery Strategy for the American Eel (*Anguilla rostrata*) in Ontario", Ontario Recovery Strategy Series, Prepared for Ontario Ministry of Natural Resources, Peterborough, Ontario, 2013, Canada, 131 pages.
McGrath et al., "Studies of Upstream Migrant American Eels at the Moses-Saunders Power Dam on the St. Lawrence River near Massena, New York", American Fisheries Society Symposium 33, 2003, United States, pp. 153-166.

(56) References Cited

OTHER PUBLICATIONS

Mesa et al., "Survival and Growth of Juvenile Pacific Lampreys Tagged with Passive Integrated Transponders (PIT) in Freshwater and Seawater", Transactions of the American Fisheries Society 141, 2012, United States, pp. 1260-1268.

Mueller et al., "Tagging Juvenile Pacific Lamprey with Passive Integrated Transponders: Methodology, Short-Term Mortality, and Influence on Swimming Performance", North American Journal of Fisheries Management vol. 26, 2006, United States, pp. 361-366.

Normandeau, "Survey for Upstream American Eel Passage at Holyoke Dam, Connecticut River, Massachusetts, 2006", Prepared for Holyoke Gas and Electric by Normandeau Associates, Inc., Apr. 26, 2007, United States, 68 pages.

Odeh, "A Summary of Environmentally Friendly Turbine Design Concepts", DOE/ID/13741 Paper, Jul. 1999, United States, 47 pages.

Økland et al., "Recommendations on Size and Position of Surgically and Gastrically Implanted Electronic Tags in European Silver Eel", Animal Biotelemetry 1:6, 2013, United Kingdom, pp. 1-5.

Pacific Northwest National Laboratory, "JSATS Tag Downsize Project Progess Report", PNNL, Apr. 26, 2010, United States, 16 pages.

Pacific Northwest National Laboratory, "Juvenile Salmon Acoustic Telemetry System (JSATS) Acoustic Transmitters", PNNL, Mar. 2010, United States, 1 page.

Panther et al., "Influence of Incision Location on Transmitter Loss, Healing, Survival, Growth, and Suture Retention of Juvenile Chinook Salmon", Transactions of the American Fisheries Society 140, 2011, United States, pp. 1492-1503.

Platt et al., "The Use of Piezoelectric Ceramics for Electric Power Generation Within Orthopedic Implants", IEEE/ASME Transactions on Mechatronics vol. 10, No. 4, Aug. 2005, United States, pp. 455-461.

Richmond et al., "Response Relationships Between Juvenile Salmon and an Autonomous Sensor in Turbulent Flow", Fisheries Research vol. 97, 2009, Netherlands, pp. 134-139.

Rifai et al., "Modeling of Piezoelectric Tube Actuators", Dspace@MIT, available online at https://dspace.mit.edu/bitstream/handle/1721.1/3911/IMST014.pdf, 2004, 8 pages.

Summerfelt et al., "Anesthesia, Surgery, and Related Techniques", in Schreck, C.B., Moyle, P.B., (Eds.), Methods for Fish Biology, American Fisheries Society, 1990, United States, pp. 213-272.

Verdon et al., "Recruitment of American Eels in the Richelieu River and Lake Champlain: Provision of Upstream Passage as a Regional-Scale Solution to a Large-Scale Problem", American Fisheries Society Symposium 33, 2003, United States, pp. 125-138.

Walker et al., "Effects of a Novel Acoustic Transmitter on Swimming Performance and Predator Avoidance of Juvenile Chinook Salmon: Determination of a Size Threshold", Fisheries Research 176, Apr. 2016, Netherlands, pp. 48-54.

Ward et al., "A Laboratory Evaluation of Tagging-Related Mortality and Tag Loss in Juvenile Humpback Chub", North American Journal of Fisheries Management 35, 2015, United States, pp. 135-140.

Wuenschel et al., "Swimming Ability of Eels (*Anguilla rostrata, Conger oceanicus*) at Estuarine Ingress: Contrasting Patterns of Cross-Shelf Transport?", Marine Biology 154, 2008, Germany, pp. 775-786.

Zale et al., "Effects of Surgically Implanted Transmitter Weights on Growth and Swimming Stamina of Small Adult Westslope Cutthroat Trout", Transactions of the American Fisheries Society vol. 134(3), 2005, United States, pp. 653-660.

WO, PCT/US2020/021744 Search Rept., dated Jun. 12, 2020, Battelle Memorial Institute.

WO, PCT/US2020/021744 Writ. Opin., dated Jun. 12, 2020, Battelle Memorial Institute.

WO, PCT/US2020/021744 IPRP, Sep. 23, 2021, Battelle Memorial Institute.

Pincock et al., "Chapter 6—Acoustic Telemetry for Studying Migration Movements of Small Fish in Rivers and the Ocean: Current Capabilities and Future Possibilities", PNAMP Special Publication: Tagging, Telemetry, and Marking Measures for Monitoring Fish Populations, Jan. 2010, United States, pp. 105-117.

\* cited by examiner

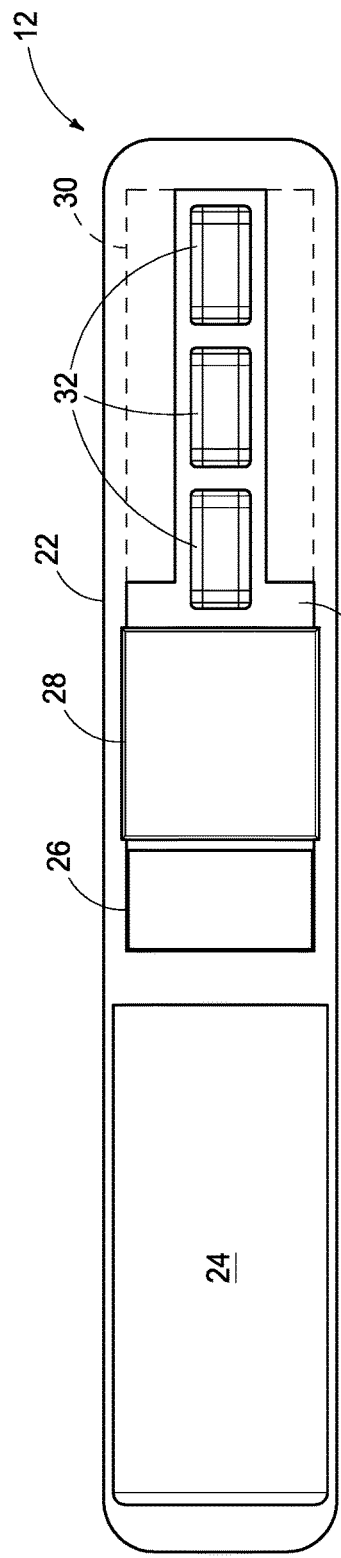
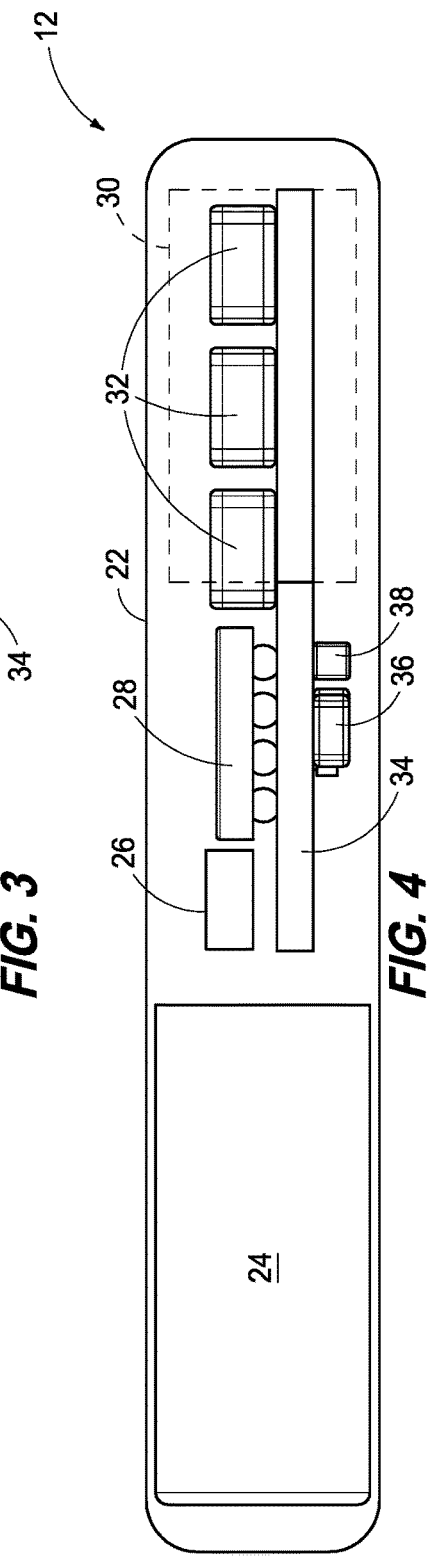
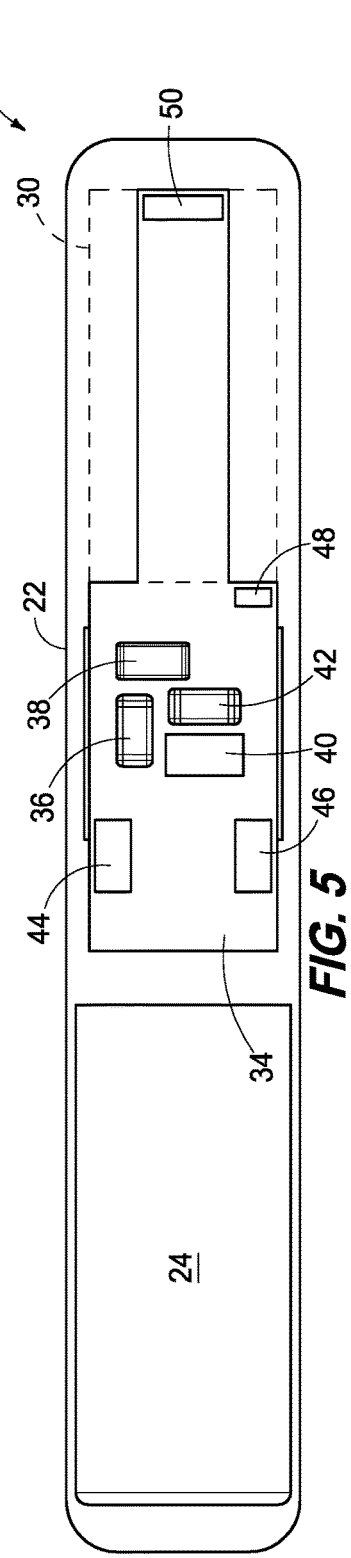

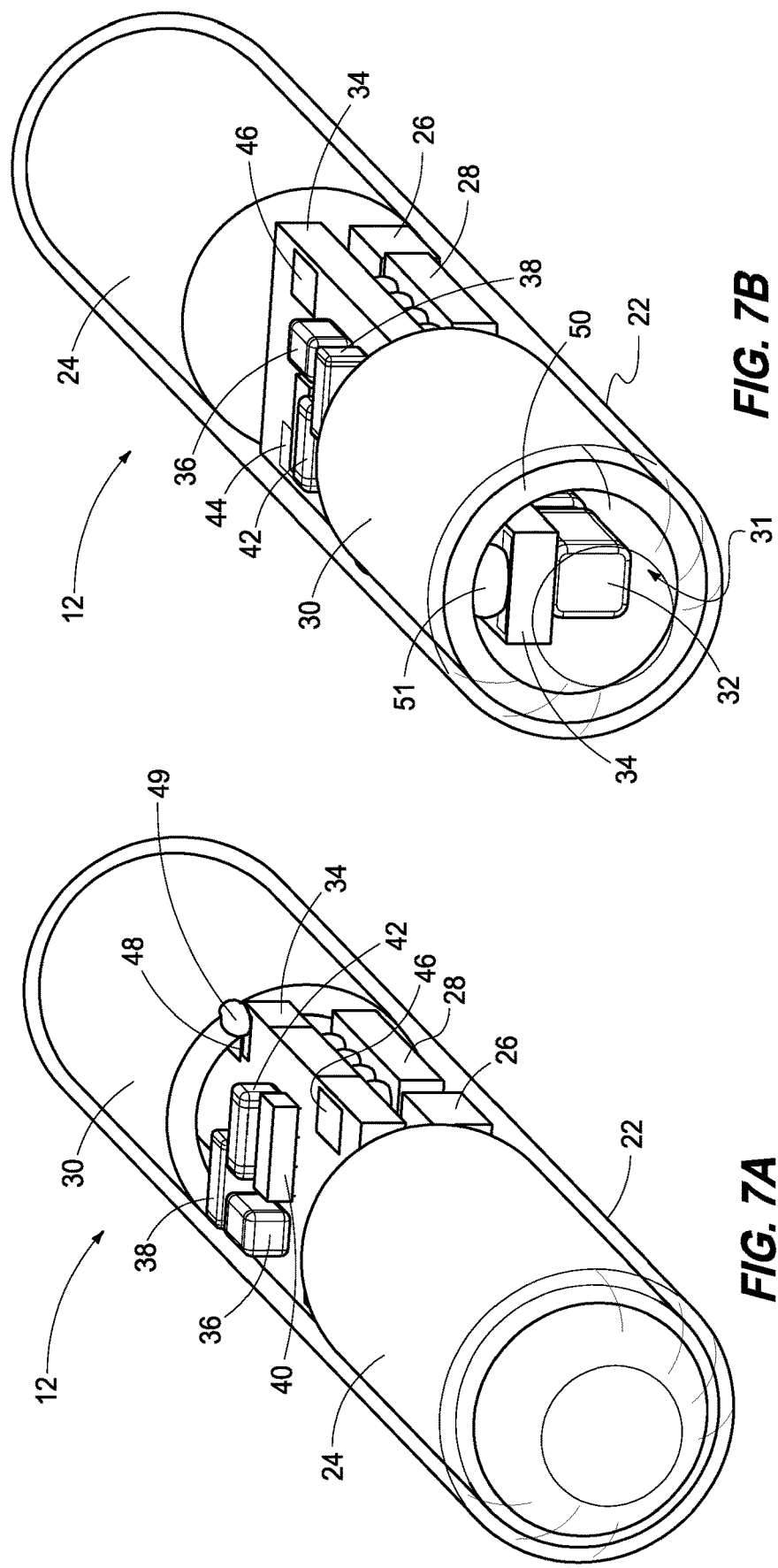

SYSTEMS AND METHODS FOR MONITORING ORGANISMS WITHIN AN AQUATIC ENVIRONMENT

RELATED PATENT DATA

This application is a continuation of and claims priority to U.S. patent application Ser. No. 15/393,617, which was filed on Dec. 29, 2019, which claims the benefit of U.S. Provisional Application Ser. No. 62/379,473, which was filed on Aug. 25, 2016, titled "Microtransmitters and Associated Methods Including Use with Eels and Lampreys", the disclosures of which are incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to systems and methods for monitoring organisms within an aquatic environment.

BACKGROUND OF THE DISCLOSURE

The American eel has been proposed for listing under the Endangered Species Act (ESA) due to significant population decline. Because of American eels' complex life histories, this ESA listing could potentially impact a significant number of hydropower projects, most likely in the Great Lakes/St Lawrence River basin, New England and the Mid-Atlantic states. In the Columbia River Basin (CRB), Pacific lampreys (Entosphenus tridentatus) are of special concern because their populations have severely declined in the past 40 years. Construction and operation of hydroelectric facilities may negatively impact juvenile lamprey because these declines occurred after the period of major hydroelectric development.

Knowledge of eel and lamprey behavior and survival are critical for developing mitigation strategies for downstream and upstream passage, including design of bypass systems at hydroelectric facilities and for irrigation diversion structures. However, other systems used to monitor other species, such as Salmon, utilize relatively large transmitters which impose significant burdens upon smaller species, such as eel and lamprey and others.

At least some aspects of the disclosure provide systems, apparatus and methods for monitoring various aquatic species according to example embodiments described in detail below.

BRIEF DESCRIPTION OF THE DRAWINGS

Example embodiments of the disclosure are described below with reference to the following accompanying drawings.

FIG. 3 is a top view of a transmission device with an internal transducer omitted to show additional details of the device according to one embodiment.

FIG. 4 is a front view of a transmission device with the internal transducer omitted according to one embodiment.

FIG. 5 is a bottom view of a transmission device with the internal transducer omitted according to one embodiment.

FIG. 7A is an isometric view of a left side of a transmission device and internal components thereof according to one embodiment.

FIG. 7B is an isometric view of a right side of a transmission device and internal components thereof according to one embodiment.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

At least some aspects of the present disclosure are directed to systems, apparatus and methods for monitoring various aquatic species in their environment. Some embodiments described below utilize transmission devices which have a sufficiently small size to enable monitoring of relatively small aquatic species including, for example, anguilliform fishes including American eels, Pacific lampreys, California Delta smelts and Asian carp which have relatively thin and flexible bodies. According to some example embodiments described below, the transmission devices generate and emit acoustic signals from the monitored organisms which propagate through surrounding water and which may be received by appropriate receiving systems to enable monitoring of the organisms as the organisms swim in their natural aquatic environment.

According to some embodiments, the transmission devices are sufficiently small to enable them to be implanted into the organisms to be monitored using injection instead of surgery. Injection of the transmission devices substantially reduces adverse effects of implantation for tagged organisms, reduces the time and cost of implantation and allows study of migration behavior and survival of relatively small aquatic species that have never been studied in the past, leading to critical information for recovery and the development of fish-friendly hydroelectric systems.

Figure 1:
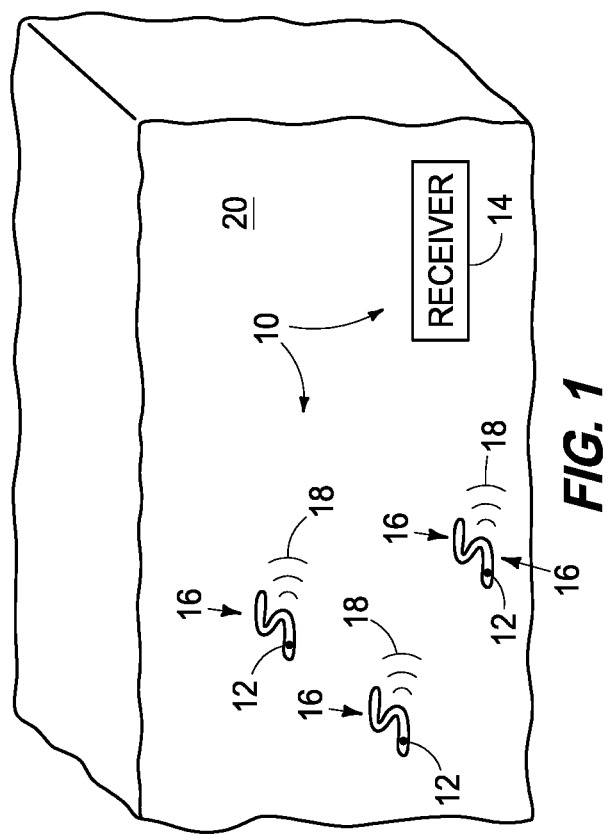
FIG. 1 is an illustrative representation of an aquatic species monitoring system according to one embodiment.
Figure 2:
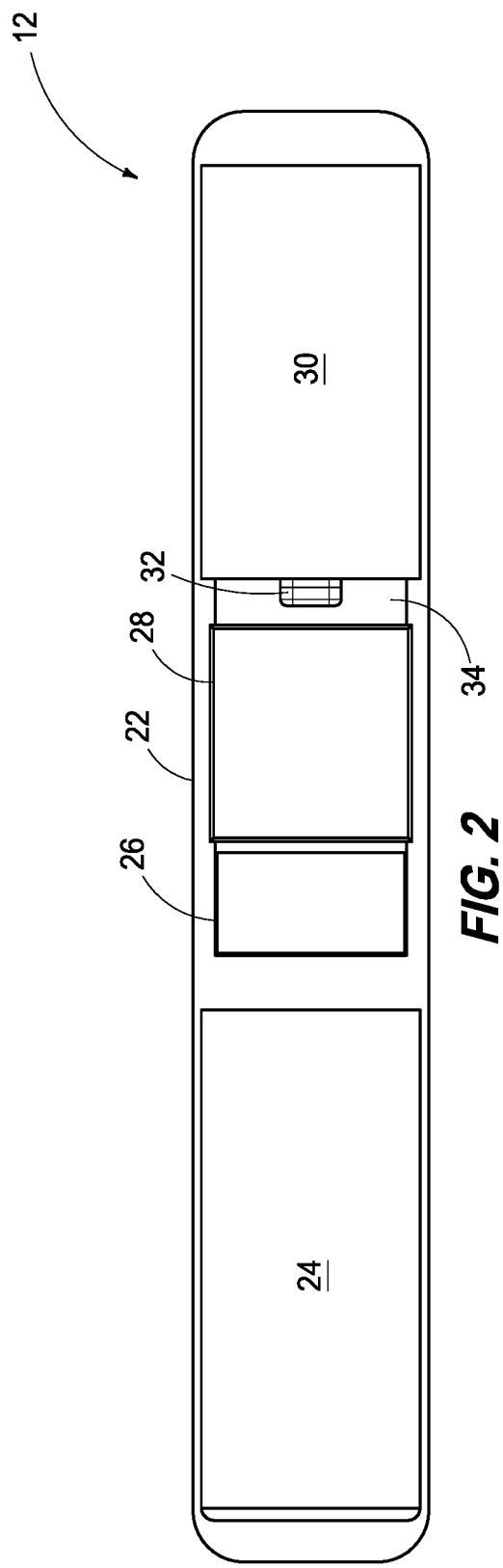
FIG. 2 is a top view of a transmission device of the monitoring system according to one embodiment.
Figure 6:
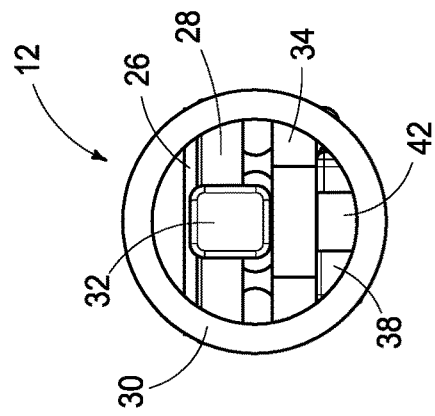
FIG. 6 is a right side view of a transmission device and internal components thereof according to one embodiment.

Referring to FIG. 1, one example embodiment of an aquatic species monitoring system 10 is shown. The illustrated system 10 includes a plurality of transmission devices 12 and a receiver 14 within a body of water 20. The transmission devices 12 are associated with a plurality of respective aquatic organisms 16 and the organisms having associated devices 12 may be referred to as tagged organisms. For example, the transmission devices 12 may be attached to or embedded within the body of an individual aquatic organism 16. In one specific embodiment described below, the transmission devices 12 may be injected into the bodies of the organism 16.

The transmission devices 12 are configured to generate and emit a plurality of data transmissions 18 externally of the organism 16 into water 20 of the environment. The data transmissions 18 are transmitted through the water 20 to one or more receivers 14 which are configured to receive the data transmissions 18 emitted from transmission devices 12. In some embodiments, the receiver 14 transmits the received signals or data within the received signals to a management system described below with respect to one example embodiment in FIG. 10.

The system 10 may include a plurality of receivers 14 positioned at different locations within the body of water 20. In some implementations, the data transmissions 18 include a unique code or identifier which may be used by a device receiving the transmissions 18 to uniquely identify the particular transmission device 12 (and particular organism 16 associated with the device 12) which emitted the data transmission 18.

Accordingly, the locations of the individual tagged organisms 16 may be generally monitored using unique identification codes in the transmissions 18 which are generated by the transmission devices 12 and the locations of the receivers 14 which receive the transmissions 18 including the unique identification codes. As an organism 16 moves throughout the aquatic environment, different receivers 14 at different locations may receive the data transmissions 18 emitted from the transmission device 12 which is associated with the organism 16 and process data of the transmissions 18 to indicate the location of the specific organism 16 at different moments in time. In one straightforward example, the organism 16 will be known to be in the vicinity of a particular receiver 14 which received the data transmissions 18 from the organism 16. In other examples, plural receivers 14 may receive the transmissions 18 and the data regarding the reception by the plural receivers 14 may be processed to provide location information of the organism 16 within the body of water 20 with increased accuracy.

Referring to FIGS. 2-7B, one embodiment of a transmission device 12 is shown. Although internal components of the transmission device 12 are visible in the figures, the transmission device 12 includes a body 22 in some embodiments which houses the internal components and circuitry. In more specific example embodiments discussed below, the internal components and circuitry of the transmission device 12 may be encapsulated within an epoxy which forms the body 22.

The transmission device 12 is configured to be injectable into an organism 16 (perhaps of relatively small size) in some embodiments and the body 22 may be configured to facilitate the injection of the transmission device 12 into the organism 16. For example, the body 22 may comprise encapsulating material which encapsulates and protects components and circuitry of the transmission device 14 while having a relatively small profile, diameter, rounded corners, and smooth exterior. Other suitable configurations for housing components and circuitry of the transmission device 14 are possible in other embodiments.

The transmission devices 12 may be associated with organisms 16 in different ways in different embodiments. In one embodiment, transmission device 12 is configured to be injected into the body of a respective organism 16 of relatively small size using an injection needle. The relatively small size of the body 22 enables smaller injection needles to be used for the injection process compared with injection needles used to inject other devices of increased size. In other embodiments, the transmission devices 12 may be injected into the bodies of the organisms 16 by other methods, such as by hand.

In one specific embodiment, the cylindrical body of transmission device 12 has a diameter of about 2.0 mm and a length of about 12.0 mm and volume of about 35.1 mm$^3$. In addition, average transmission devices 12 configured as described above weigh approximately 0.087 grams in air. In one embodiment, the weight of encapsulating epoxy is about 11.0 mg, the weight of the populated circuit board is about 27.7 mg, the weight of the battery is about 21.0 mg, and the weight of the transducer 30 is about 27.5 mg. Transmission devices 12 of other configurations may be used in other embodiments.

The size of the transmission devices 12 in the above-mentioned example has been designed for implantation into organisms 16 without the need for sutures to close the incision, in part because the incision is less than about 3 mm long. A small incision without sutures can shorten both surgery and healing time which reduces potential negative effects from surgical implantation. In addition, weight and volume of the transmission devices 12 have also been shown to be important considerations because they are a measure of the burden (i.e., the weight of the device 12 relative to the weight of the organism) that, when coupled with the surgical implantation process (e.g., anesthesia, handling, surgery), can affect retention of the device 12, survival, growth, swimming performance, or ability of the organism 16 to avoid predation. The relatively small size and weight of the transmission devices 12 reduces the burden of the transmission devices 12 imposed on the tagged organisms 16.

Still referring to FIGS. 2-7B, transmission device 12 may include a power source 24, an oscillator 26, control circuitry 28, a transducer 30, a plurality of storage capacitors 32, a circuit board 34, a resistor 36, a smoothing capacitor 38, an optical sensor 40, a resistor 42, first and second battery pads 44, 46, and first and second transducer connection pads 48, 50 in the depicted example embodiment. The transducer 30 is omitted in FIGS. 3-5 to facilitate understanding of additional details of the interior of the depicted example transmission device 12. In addition, some of the electrical connections between components have been omitted in FIGS. 2-7B. The dimensions included in FIGS. 5-6 of the illustrated example embodiment indicate measurements in millimeters.

Power source 24 supplies operational electrical energy to components of transmission device 12 in the illustrated embodiment. In one embodiment, the power source 24 is in the form of a battery configured to power the entire transmission device 12. The terminals of the battery are coupled with positive voltage pad 44 and negative voltage pad 46 upon circuit board 34 via suitable electrical connections (the terminals of the battery and electrical connections to pads 44, 46 are not shown). In one more specific embodiment, the battery is a lithium/carbon fluoride (Li/CFx) micro-battery that is about 1.8 mm in diameter, about 4.2 mm in length, has a nominal capacity of about 1.2 mAh, and a voltage of approximately 2.7 Volts.

The pads 44, 46 are coupled to a power filter 25 which contains one or more storage capacitors 32 (e.g., 10 uF tantalum capacitors) for bulk storage of electrical energy from the power source 24. Storage capacitors 32 help limit the peak current drawn from the power source 24 so the peak current does not exceed a limit which might damage the power source 24. In one embodiment, the power filter 25 additionally includes resistor 36 (e.g., 1 kOhm resistor) in series with the power source 24 to further reduce the peak current drawn from the power source 24. In one embodiment, smoothing capacitor 38 (e.g., 0.1 uF ceramic capacitor) is placed in parallel with the one or more storage capacitors 32 for high-frequency power supply bypass.

The outputs of the power filter 25 are coupled to the control circuitry 28 which uses the stored energy to generate electrical signals (also referred to as driving signals) which are used to drive the transducer 30 to create the data transmissions 18. Transducer 30 is configured to receive the electrical signals from the control circuitry 28 and to convert the received signals into the data transmissions 18 which are transmitted externally of the body 22 of the organism 16 into the water 20. In one embodiment, transducer 30 is implemented as a piezoelectric transducer (PZT) which vibrates according to the received driving signals. The vibrations create the data transmissions 18 in the form of acoustic signals which propagate through the water 20 to receiver 14 in one example embodiment.

In one embodiment, control circuitry 28 is arranged to process data, control data access and storage, issue commands, generate binary strings for inclusion with the data transmissions, control the generation of the data transmissions, and control other desired operations. For example, control circuitry 28 may be configured to control operations of transmission device 12 including monitoring of the environment about the device 12, such as the temperature of the environment. In addition, control circuitry 28 uses electrical energy from power source 24 to generate the electrical signals which are applied as driving signals to the transducer 30 to drive transducer 30 as mentioned above. Furthermore, control circuitry 28 may be configured to automatically adjust the output voltage of the power source 24 to retain a full power level as the power source 24 discharges as a function of time in some embodiments.

Control circuitry 28 may comprise circuitry configured to implement desired programming provided by appropriate non-transitory computer-readable storage media (e.g., internal storage of control circuitry 28, for example when the control circuitry 28 is implemented using a microcontroller) in at least one embodiment. For example, the control circuitry 28 may be implemented as one or more processor(s) and/or other structure configured to execute executable instructions including, for example, software and/or firmware instructions. Other example embodiments of control circuitry 28 include hardware logic, PGA, FPGA, ASIC, hardware state machines, and/or other structures alone or in combination with one or more processor(s). These examples of control circuitry 28 are for illustration and other configurations are possible.

In one more specific embodiment, the control circuitry 28 is implemented as an EFM8SB10F8G-A-CSP16 "Sleepy Bee" microcontroller in a chip scale package available from Silicon Laboratories, Inc. The microcontroller is shown in one example embodiment in FIG. 9 as reference numeral 29.

In this example implementation, the control circuitry 28 includes circuitry configured to execute firmware as well as storage circuitry, an internal temperature sensor, and one or more internal oscillators. The storage circuitry can store the firmware to control operations of the transmission device 12 as well as codes included within the data transmissions 18. The temperature sensor is configured to monitor the temperature of the environment about the transmission device 12 which is associated with the organism 16. In addition, data collected from the temperature sensor may be stored and included in the data transmissions 18. Device 12 may also include additional on-board sensors which are configured to monitor additional aspects of the environment of the transmission device 12 (e.g., pressure) and the additional environmental data may also be communicated in the data transmissions 18. Finally, the one or more internal oscillators may be used to regulate the timing aspects of the operations of the transmission device 12, such as the modulation frequency of the data transmissions 18, the time between data transmissions 18, or the waiting time prior to the first data transmission 18.

Control circuitry 28 generates the electrical signals which are applied as driving signals to the transducer 30 to create the data transmissions 18. The driving signals are applied to the transducer 30 at defined intervals for periodic generation of the data transmissions 18 in one implementation. The electrical energy of the driving signals may be stored in part on storage capacitors 32. The format of the transmitted information within data transmissions 18 is configurable, which allows each transmission device 12 to have various and different user-defined encoding configurations suitable for various applications. For example, the number and length of the codes included in the data transmissions 18 are configurable.

In one embodiment, the driving signals encode a binary string using binary phase shift keying (BPSK). In one more specific embodiment, the modulation frequency used for the BPSK is nominally 416.7 kHz. In another more specific embodiment, the binary string may contain a 7-bit Barker code, a unique 16-bit tag identification code, and an 8-bit cyclic redundancy check (CRC), for a total length of 31 bits in a respective data transmission 18. Other encoding, modulation frequencies, or communication formats may be used in other embodiments: for example, 64 bits may be transmitted in other data transmissions 18 and include additional data. The data transmissions 18 may each include additional data from internal sensors of the transmission device 12, such as a temperature reading from the internal temperature sensor of the "Sleepy Bee" microcontroller.

In one embodiment, the control circuitry 28 is configured to control the transmission of the data transmissions 18 at different moments in time which are defined according to a selected one of a plurality of different pulse rate intervals (PRI). In one embodiment, the specific desired interval is selected during the configuration of the transmission device 14 and can be configured from 1 to 256 seconds in steps of $\frac{1}{256}$ of a second. The use of a longer pulse rate interval decreases the rate electrical energy is used from the power source 24 and extends the operational life of the device 12 compared with use of shorter intervals.

In another embodiment, the control circuitry 28 can alternate between different binary strings in successive data transmissions 18. Alternating between two binary strings increases the number of possible unique binary identifications (IDs) while maintaining backward compatibility with existing receiver equipment. For example, if each code contains a 16-bit tag ID code, two codes provide a total of 65,536 times 65,536, or over 4 billion unique IDs. Additionally, the transmission devices 14 may transmit the same binary string in each of data transmissions 18 in other implementations so as to be backward compatible with existing monitoring systems.

In one embodiment, external oscillator 26 provides a known timing reference for the control circuitry 28. In one more specific embodiment, the oscillator 26 generates a 256 Hz signal which is used to calibrate an internal oscillator of control circuitry 28 as discussed further with respect to example embodiments below.

In one embodiment, transducer 30 is a piezoelectric transducer (PZT) which is a made from PZT-5H (or "Type VI") material, such as lead zirconate titanate. In one more specific embodiment, the transducer 30 is a ceramic tube that emits acoustic signals responsive to electrical signals received from control circuitry 28. In addition, transducer 30 is oriented with its length direction parallel to the length of the transmitter body 22 and has an outer diameter of about 1.8 mm, an inner diameter of about 1.4 mm and a length of about 3.4 mm in the described example embodiment.

Transducer 30 operates in the length mode to generate the data transmissions 18 in some of the disclosed embodiments. For example, in one implementation where the receiver 14 is tuned to a specific frequency, the length of the transducer 30 is chosen such that the transducer 30 can resonate at the same frequency (e.g., 416.7 kHz) along its length direction. Other transducers 30 may be used in other embodiments.

In the described example embodiment, transducer 30 defines an internal volume (e.g., the interior volume defined by the ceramic tube) which may be occupied by internal components and/or circuitry of transmission device 12, for example, to reduce the volume and size of the transmission device 12. In the illustrated example, a portion of the circuit board 34 and a plurality of components thereon (e.g., three storage capacitors 32) are provided within the internal volume defined by transducer 30.

Referring to FIGS. 7A and 7B, electrical connections 49, 51 in the form of silver epoxy are used to electrically connect pad 48 with the outside of the transducer 30 and pad 50 with the interior of the transducer 30, respectively, in the illustrated embodiment. The silver epoxy at these two locations also serves to structurally affix the transducer 30 to the circuit board 34. Electrical connections 49, 51 apply the electrical signals to the transducer 30 which generates the data transmissions 18 in response thereto. The connections 49, 51 are made to the inner and outer walls of the transducer 30 in the presently described embodiment and transducer 30 is exited or driven in the wall thickness direction by the received electrical signals. Electrical connections including the pads 48, 50, electrical traces of the circuit board 34, and silver epoxy electrical connections 49, 51 are used to directly electrically connect the control circuitry 28 (e.g., pins of control circuitry 28 implemented as a microcontroller 29) with the transducer 30 in some of the disclosed embodiments.

Optical sensor 40 provides an optical link for receiving configuration commands from an external source which configure the transmission device 12 in one embodiment. In the described example embodiment, optical sensor 40 is implemented as a blue light emitting diode (LED). Although a typical function of a blue LED is to convert electrical signals into blue light, some blue LEDs are also capable of converting violet or ultraviolet light into electrical signals. Shining violet or ultraviolet light onto a blue LED generally produces a voltage of about 2.0 V.

In one embodiment, a configuration device (not shown), such as an external programming pen which is connected to a personal computer, may be used to transmit the configuration commands to optical sensor 40 to configure the device 12. In a specific example embodiment, the external programming pen may include an ultraviolet LED which is turned on and off at coded intervals in proximity to optical sensor 40 of device 12. The generated ultraviolet light is received by optical sensor 40 which provides corresponding electrical signals to control circuitry 28 to configure device 12. Control circuitry 28 decodes the received electrical signals and configures parameters of the device 12, such as one or more unique code of the transmission device 28, transmit interval of data transmissions 18, and the operating mode to be entered following configuration, such as the hibernation mode for a specified period of time. The ultraviolet light generally propagates through the transparent encapsulating epoxy of the body 22 with negligible attenuation. In this embodiment, it is desired that the voltage of the power source 24 does not exceed 3.0 V or so; otherwise, the "Sleepy Bee" microcontroller may fail to recognize the 2.0 V signal from the blue LED as a "logic 1" state.

In but one embodiment, oscillator 26 is implemented as a SiT1534AI-J4-DCC-00.2565 oscillator available from SiTime, storage capacitors 32 are individually implemented using a TLCK106M004QTA capacitor available from AVX Corporation, resistor 36 is implemented using a ERJ-1GEJ102C resistor available from Panasonic Electronics Corporation, capacitor 38 is implemented using a C0603X5R1A104K030BC capacitor available from TDK Corporation, optical sensor 40 is implemented using a KPG-0603PBC-TT-5MAV LED available from Kingbright Electronics Co., Ltd., and resistor 42 is implemented using a ERJ-1GEF1004C resistor available from Panasonic Electronics Corporation. The values and design of the components in the depicted embodiment of FIGS. 2-7B were selected to optimize the physical size, peak current, and voltage drop of the circuit, although many other options are viable. In but one example, resistor 36 may be omitted in other implementations.

Operational firmware may be loaded onto internal storage circuitry of the control circuitry 28 during the manufacturing process to dictate the overall operation of the transmission device 12. In one embodiment, the control circuitry 28 controls operations of device 12 in a plurality of operating modes including a waiting mode, a hibernating mode, a run mode, a calibration mode and a configuration mode.

In the waiting mode, the control circuitry 28 remains in an ultralow-power state until a configuration command is received via the optical sensor 40. In configuration mode, the control circuitry 28 reads externally generated coded commands from optical sensor 40. Following configuration of the device 12, one of the commands may control the device 12 to enter a hibernating mode whereby the control circuitry 28 remains in a low-power state for a fixed duration of time prior to transitioning to run mode. Alternatively, one of the commands may control the device 12 to enter run mode directly. In run mode, the control circuitry 28 transmits data transmissions 18 including unique identifiers and codes at periodic intervals according to a desired pulse rate interval which may be different in different applications. The hibernation time, pulse rate interval, and other parameters may be configured via additional configuration commands received on optical sensor 40.

The calibration mode may be entered after a defined number of data transmissions 18 have been emitted by the device 12. In one calibration example, external oscillator 26 provides a known timing reference to the control circuitry 28 which calibrates the frequency of its internal timers against the timing reference received from the external oscillator 26. More specifically, external oscillator 26 generates a 256 Hz signal which is used to calibrate at least one of the internal oscillators of the "Sleepy Bee" microcontroller.

In one embodiment, the external oscillator 26 is periodically enabled (i.e., powered on) to generate the known timing reference to calibrate at least one of the internal oscillators of microcontroller 29 to 16.667 MHz. During run mode, the microcontroller 29 may then switch its clock source to that of the internal oscillator and then generate waveforms at a nominal frequency of 416.7 kHz, which equals 16.667 MHz divided by 40. The microcontroller 29 may only turn external oscillator 26 on when needed in some embodiments, which saves considerable power compared with operating the external oscillator 26 continuously in other implementations. A calibration may be performed after several hundred transmissions so that the modulation frequency used to generate the data transmissions 18 does not drive outside the 416.7 kHz+/−0.5% specification in the presently described embodiment.

The microcontroller 29 may also use the timing reference from external oscillator 26 to measure the actual operating frequency of at least one internal oscillator. In the example embodiment, the at least one internal oscillator has a nominal operating frequency of 16.4 kHz but may vary by 20% or more. The microcontroller 29 may then use the measurement to generate a stable pulse rate interval. The microcontroller 29 may also use the measurement to remain in hibernating mode for a specified amount of time prior to the first data transmission 18.

In one embodiment described below, an encapsulating material, such as an epoxy, is used to encapsulate the components and circuitry of transmission device 12 and to define the body 22 of the device 12. Additional details regarding one example manufacturing process of transmission device 12 are described below.

Initially, the discrete components, the power source, integrated circuits and transducer are electrically coupled with respective electrical conductors of the circuit board 34 via any suitable electrical connection. The circuit board 34 may be part of a circuit array panel which includes a plurality of additional circuit boards. In some embodiments, internal components and/or circuitry of the device 12 may be received within an internal volume which is defined by the transducer 30 as discussed above. The two ends of the transducer 30 are sealed using a mixture of an epoxy-glass bubble mixture to prevent the epoxy used in subsequent encapsulation steps from entering the internal volume defined by transducer 30. Examples of the epoxy and glass bubbles are the EPO-TEK 301 and 3M Glass Bubbles A16/500, respectively. An exemplary mixing ratio (epoxy to glass bubbles) is 5:1 by weight. Thereafter, a Parylene-C layer with a thickness of about 25 um is applied to the assembly.

In the example embodiment, an external power supply may be used to power the microcontroller 29 of the assembly while power source 24 is electrically coupled with pads 44, 46 of circuit board 34. This procedure ensures that microcontroller 29 powers up properly. The external power supply is coupled to the microcontroller 29 via external diode 31. An external resistor 33 (e.g., a 1 kOhm resistor) prevents the occurrence of spurious reset conditions. Thereafter, the external power supply is removed and the transmitter assembly is cut from the circuit array panel.

Thereafter, the transmitter assembly is placed in a plastic mold and encapsulated using an appropriate encapsulating material such as a resin to form the body 22. Resins suitable for use include thermosetting epoxies such as, e.g., EPO-TEK 301 or 3M Scotchcast Electrical Resin 5 in illustrative examples, which form the body 22 of the transmission device. The transmission device including the encapsulated components is removed from the mold, and the body 22 of the transmission device is polished to obtain a smooth finish appropriate for association with an organism, for example by injection. A final ~25 um layer of Parylene-C may be applied to the transmitter device 12 as a waterproof and biocompatible layer.

Figure 8:
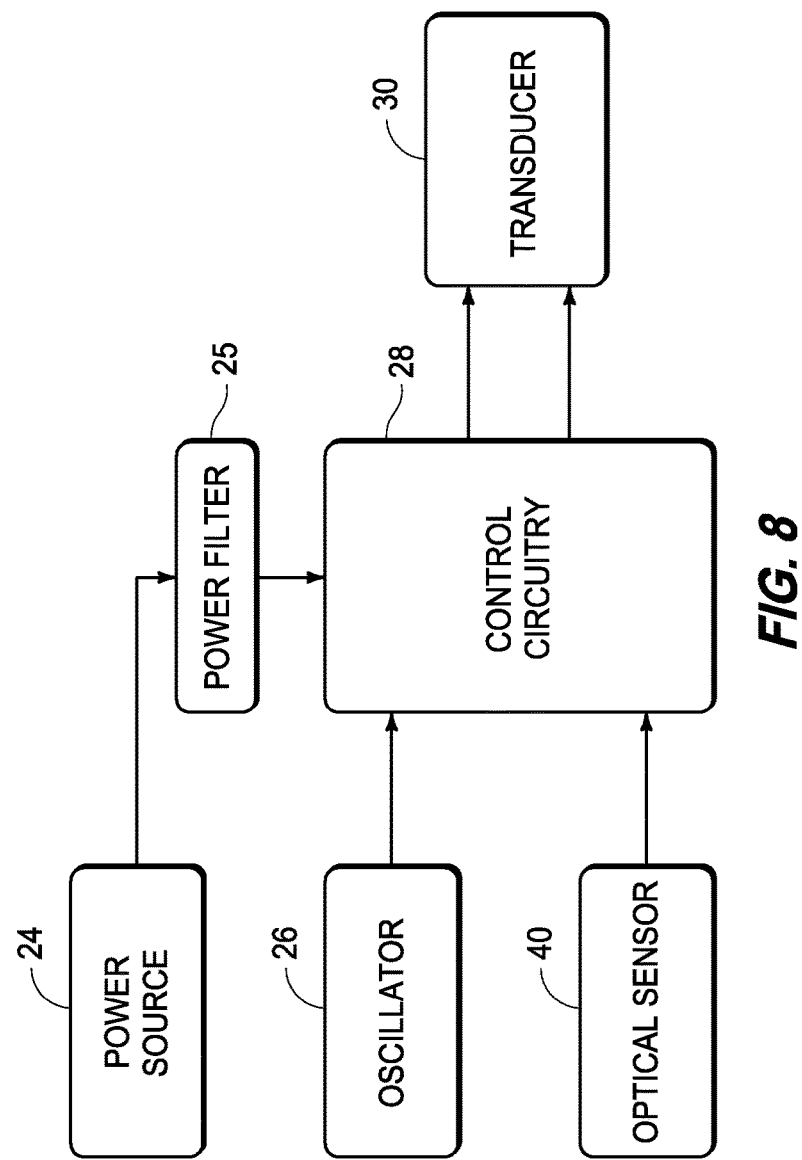
FIG. 8 is a functional block diagram of circuitry and components of a transmission device according to one embodiment.

Referring to FIG. 8, a functional block diagram of circuitry and circuit components of transmission device 12 is shown according to one embodiment. Power source 24 provides operational electrical energy to control circuitry 28 via power filter 25. Control circuitry 28 implements operations of the device 12, including accessing monitored data, such as temperature, and generating periodic data transmissions 18. Oscillator 26 provides a timing reference which may be selectively enabled during calibration operations to calibrate control circuitry 28. Optical sensor 40 provides an interface for receiving commands which configure operations of the device 12. Control circuitry 28 generates and outputs electrical signals to transducer 30 which vibrates to generate the data transmissions 18 which are emitted from the transmission device 12 and organism 16.

Figure 9:
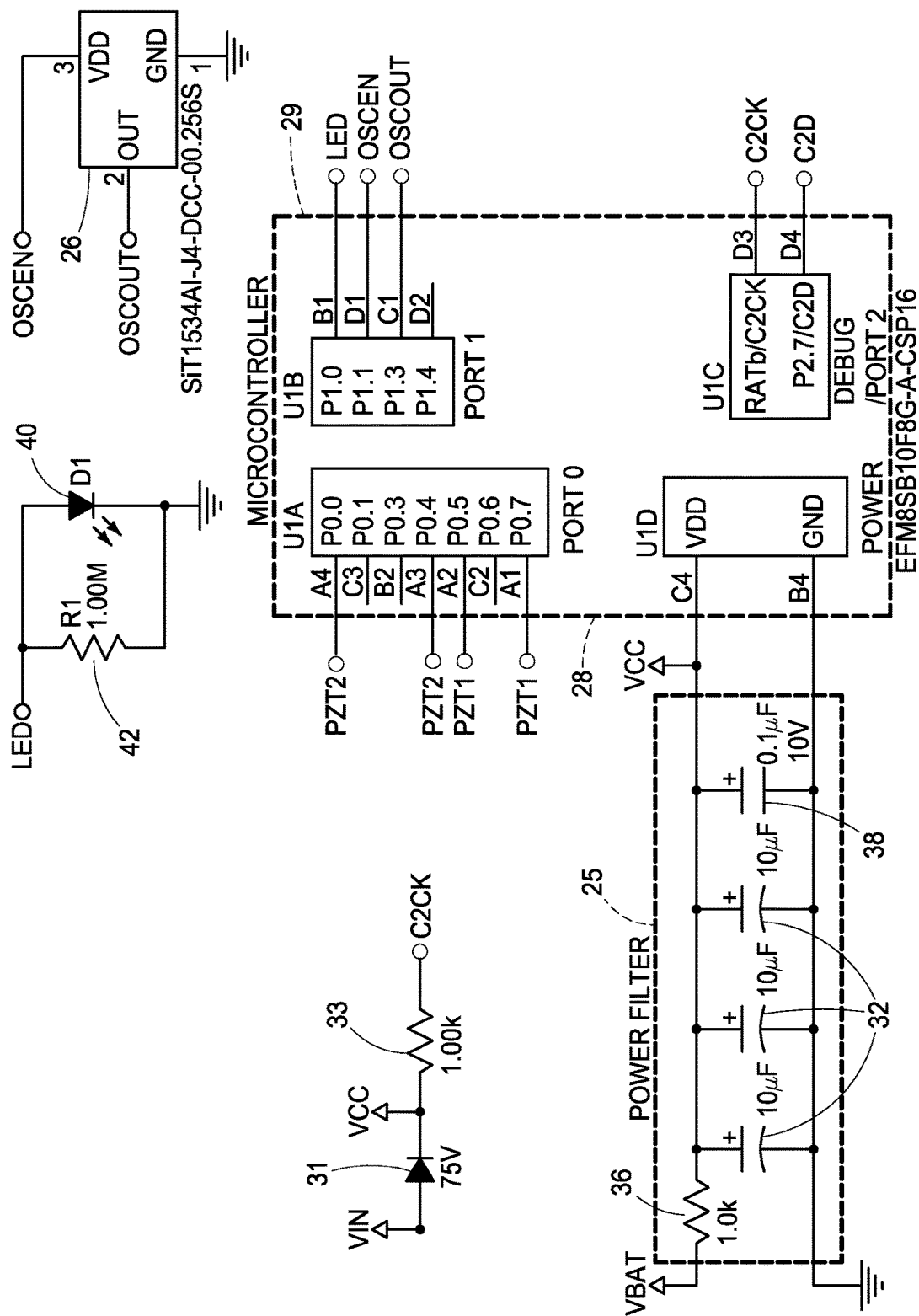
FIG. 9 is a schematic diagram of circuitry of a transmission device according to one embodiment.

Referring to FIG. 9, a circuit diagram of circuitry and electrical components is shown according to one embodiment of transmission device 12. Connections of various input/output pins of microcontroller 29 are depicted with respect to power filter 25, oscillator 26, optical sensor 40, and transducer 30. In the depicted example embodiment, pins A1, A2 of microcontroller 29 are coupled in parallel with pad 50 and pins A3, A4 of microcontroller 29 are coupled in parallel with pad 48, and pads 48, 50 are also electrically connected to transducer 30. Accordingly, some pins of the microcontroller 29 are coupled with the transducer 30 at a first location adjacent to a first end of the transducer 20 and a plurality of second pins of the microcontroller 29 are coupled with the transducer 30 at a second location adjacent to a second end of the transducer 30.

There are a number of design details which enable the transmission device 12 to be implemented within body 22 of reduced volume and size compared with other transmitter arrangements or implementations. Furthermore, some design details provide reduced power consumption compared with some other transmitter configurations which enables power sources of reduced sizes and capacities to be used which in turn reduces the overall volume and size of the transmission device 12.

According to some embodiments, transducer 30 resonates at the 416.7-kHz frequency used in other designs but in a much smaller transmitter body 22 (e.g., the diameter does not exceed 2.0 mm in some of the disclosed embodiments). Examples which use transmitters of larger sizes include injectable salmon transmitter systems which may be used in a Juvenile Salmon Acoustic Telemetry System (JSATS) and are described in a co-pending US patent application entitled "Injectable Acoustic Transmission Devices and Process for Making and Using Same", naming Z. Daniel Deng, Mitchell J. Myjak, Thomas J. Carlson, Jie Xiao, Huidong Li, Samuel S. Cartmell, Jun Lu, Honghao Chen, M. Bradford Eppard and Mark E. Gross as inventors, having Ser. No. 14/014,035, and which was filed on Aug. 29, 2013; and a co-pending US continuation-in-part patent application entitled "Acoustic Transmission Devices and Process for Making and Using Same", naming Z. Daniel Deng, Mitchell J. Myjak, Thomas J. Carlson, Jie Xiao, Huidong Li, Samuel S. Cartmell, Jun Lu, Honghao Chen, M. Bradford Eppard and Mark E. Gross as inventors, having Ser. No. 14/914,974, which was filed on Feb. 26, 2016, and the teachings of which are incorporated herein by reference.

At least some of the transmission devices 12 described herein may be utilized with receivers of other systems, such as the receivers of the injectable salmon transmitter systems disclosed in the above-mentioned patent applications. The smaller size of the transmission devices 12 disclosed herein reduces the burden upon the tagged organisms 16, and needles of reduced size may be used to inject the transmission devices 12 disclosed herein (compared with those used to inject devices of larger sizes) resulting in implanting operations which are less invasive to the organisms 16.

For example, circuitry and components of the transmission device, such as one or more discrete components, a portion or an entirety of a circuit board, and one or more semiconductor devices, may be received within an internal volume defined by transducer 30 which decreases the volume and size of the body 22 needed to accommodate the circuitry and components compared with arrangements which do not include components or circuitry within the interior of the transducer 30.

Some transmitters of JSATS systems use cylindrical transducers which operate in a hoop resonance mode to generate acoustic transmissions. However, in some of the embodiments disclosed herein, the length resonance mode of a cylindrical transducer is used to achieve the same 416.7-kHz resonance frequency for use in JSATS systems in a cylindrical transmitter body that has a much smaller diameter. The transducer 30 resonates along the length direction of the tube during operation in the length resonance mode. For example, body 22 of an example embodiment of transmission devices 12 described herein has a diameter of 2.00 mm while the cylindrical transducers of some JSATS transmitters have a significantly larger diameter of 2.54 mm.

The resonance frequency of the length mode of a cylindrical transducer 30 is determined by the tube's length (L) and the ceramic material's length-mode frequency constant ($N_l$) and is not dependent upon the diameter of the tube. The length-mode resonance frequency is defined by $$f_{length} = \frac{N_l}{L}.$$

In some embodiments disclosed herein, ceramic transducers are used where $N_l$ of the ceramic is about 1400 and the length was selected to be 3.4 mm to achieve the 416.7 kHz resonance frequency. Accordingly, the length of the transducer 30 was selected corresponding to the desired frequencies of the data transmissions 18 to be emitted in some embodiments.

For example, when the transducer 30 is excited by an AC electrical driving signal, all vibration modes of the transducer 30 in the form of a tube (e.g., length mode, hoop mode, thickness mode, etc.) are active simultaneously. Depending on the frequency of the input AC signal, whichever dimension satisfying the corresponding resonance frequency equation (such as the equation for $f_{length}$) would result in a resonance and the vibrations in that direction would have a much greater amplitude than the vibrations along other directions whose dimensional values do not satisfy their own resonance equations. In one embodiment, only the length of the transducer 30 in the form of tube satisfies the resonance condition while the diameters (outer diameter and inner diameter) and wall thickness do not. As a result, the transducer 30 resonates only in the length direction while also vibrating in the hoop-mode but at a much lower amplitude in the presently described example embodiment. Other configurations of transducers 30 and/or driving signals of other frequencies may be used in other embodiments.

Furthermore, example embodiments of the transmission device 12 described above use an external 256-Hz oscillator during calibration to tune at least one internal oscillator of the microcontroller 29 to 16.667 MHz, which the microcontroller 29 then converts into the desired 416.7-kHz frequency for data transmissions 18. In one embodiment, the oscillator 26 is only powered on during operation in the calibration mode which permits a smaller power source 24 to be utilized which significantly reduces the size of the circuit board 34.

In addition, the optical sensor 40 for receiving commands from an external source is implemented using a blue LED in some of the embodiments described above. Compared to other interface alternatives, the blue LED is extremely small and does not consume quiescent current that would otherwise drain the power source 24, enabling use of power sources of reduced capacity and size. In one embodiment, the blue LED has a 0201 surface mount package and a 1.0 MΩ resistor 42 may be placed in parallel with the optical sensor 40 to help the voltage return to "logic 0" state when the programming ultraviolet LED is turned off.

Further, in one embodiment, electrical signals to drive the transducer 30 are directly outputted by the microcontroller 29 and received at the transducer 30 via respective electrical connections with no intervening circuit components, such as transistors or analog switches, between the microcontroller 29 and the transducer 30. More specifically, the microcontroller 29 pulls energy from the power source 24 via power filter 25 and applies a 416.7-kHz voltage waveform directly on the transducer 30 to induce a natural resonance on the transducer 30 near that frequency. Compared to the driving method of the transmitters discussed in the patent applications incorporated by reference above, the use of the microcontroller 29 to directly drive the transducer 30 removes the need for additional circuit components including two analog switches to generate the driving waveform, and therefore allows for a smaller transmitter design.

In some embodiments, microcontroller 29 is able to take over the function of the analog switches because it has high current driving capability on its input/output pins (e.g., 100 mA maximum current rating). In addition, in embodiments disclosed herein, two input/output (I/O) pins of the microcontroller are coupled in parallel to each of the interior and exterior of the transducer 30 for even higher current capacity.

Referring to example embodiments of FIGS. 7A-7B and 9 discussed above, pins A1, A2 of microcontroller 29 are coupled in parallel with pad 50 which is coupled with the interior surface of transducer 30 and pins A3, A4 of microcontroller 29 are coupled in parallel with pad 48 which is coupled with the exterior surface of transducer 30. A series inductor utilized in the salmon transmitters of the above-mentioned patent applications may also be omitted which allows for a smaller design at the expense of source level.

Example transmission devices 12 configured as described herein have an average source level of 147 dB (Reference: 1 uPa at 1 meter), which would allow for a detection range up to 100 meters in a realistic river environment and can generate data transmissions 18 for about 6.4 days at a pulse rate interval of 1 second, or about 30 days at a pulse rate interval of 5 seconds.

The use of the "Sleepy Bee" microcontroller 29 according to some embodiments is beneficial since it contains an on-board linear regulator that reduces the supply voltage to a fixed value, which is nominally 1.8 V in one embodiment. The internal timers inside the microcontroller 29 thus remain more stable against fluctuations in supply voltage. This feature allows the microcontroller 29 to use the internal timers, rather than a relatively large external oscillator, as the reference clock during transmission.

Figure 10:
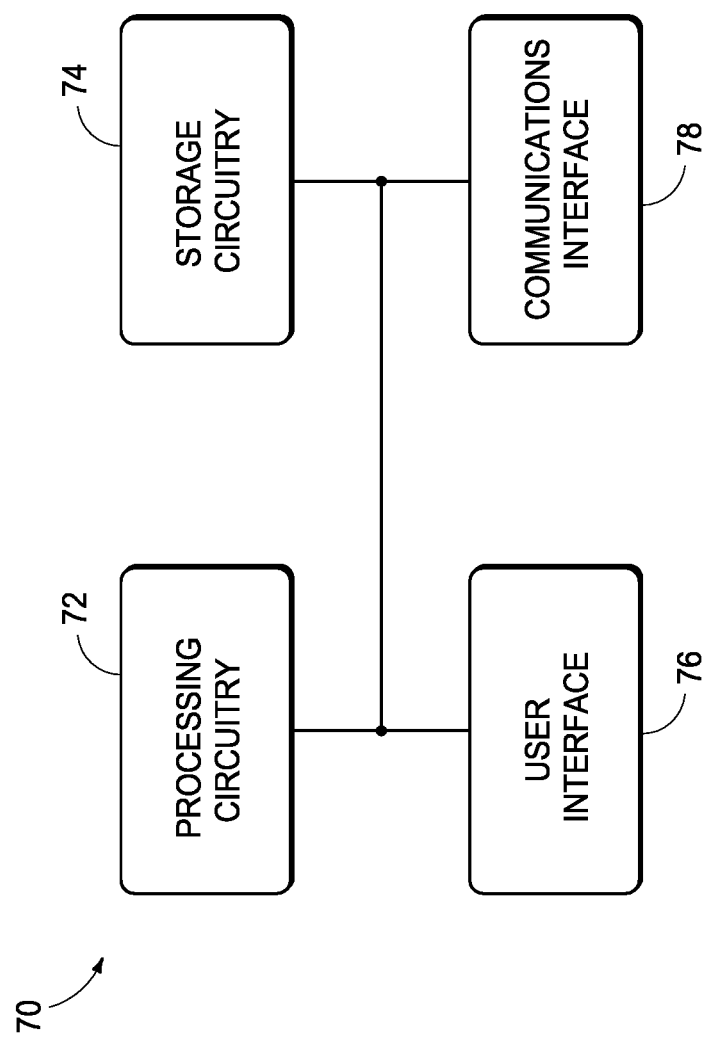
FIG. 10 is a functional block diagram of a management device according to one embodiment.

Referring to FIG. 10, one embodiment of a management device 70 is shown. Management device 70 is configured to receive information regarding the monitoring of one or more aquatic organisms 16 from one or more receiver 14. In illustrative examples described above, data within the data transmissions 18 which are emitted from the transmission devices 12 and received by the receiver 14 is communicated to the management device 70 to permit monitoring of locations of tagged organisms 16 and storage of the data for later use. Personnel using the monitoring system 10 may monitor the data received by the management device 70 and operations of the management device 70 and monitoring system 10. In the illustrated example embodiment, management device includes processing circuitry 72, storage circuitry 74, a user interface 76, and a communications interface 78. Other embodiments of management device 70 are possible including more, less and/or alternative components.

In one embodiment, processing circuitry 72 is arranged to process received data, control data access and storage, control interactions with a user, issue commands, and control other desired operations. Processing circuitry 72 may comprise circuitry (e.g., microprocessor) configured to implement desired programming such as ordered instructions of a program stored upon appropriate computer-readable storage media in at least one embodiment.

Storage circuitry 74 is configured to store programming such as executable code or instructions (e.g., software and/or firmware), data received from transmission devices 12, databases, and other digital information and may include computer-readable storage media, such as memory, a disk drive, etc.

User interface 76 is configured to interact with a user including conveying data to a user (e.g., displaying visual images regarding results of the monitoring of organisms 16 for observation by the user) as well as receiving inputs from the user. User interface 76 is configured as graphical user interface (GUI) in one embodiment and may be configured differently in other embodiments.

Communications interface 78 is arranged to receive the wireless data transmissions 18 propagating through the aqueous environment from transmission devices 12 and provide data contained with the received transmissions regarding the monitoring of the organisms to processing circuitry 72.

In some embodiments, the data transmissions 18 when received from the transmission devices 12 may be decoded by the processing circuitry 72 to extract data which identifies and tracks the host organisms 16 in up to three dimensions in real-time or as a function of time and may include timestamps which identify the moment in times when the respective data was captured or communicated. This extracted data may be stored in a database of storage circuitry 74 for subsequent usage.

As mentioned above, surgical procedures may be used to associate the transmission devices 12 with the organisms 16. Example details of a process to inject the transmission devices 12 into eels are described below although other methods may be used in other embodiments.

Prior to surgery, the organisms (juvenile American eels) may be anesthetized in 240 mg/L of tricaine methanesulfonate (MS-222) buffered with equal parts of sodium bicarbonate, and time to stage four sedation was ~3.5 min. Fish were tagged by placing them ventral side up in a groove cut into a closed-cell foam pad saturated with 150 uL/L Fish Protector® available from Kordon LLC, Hayward, Calif. A 2-3 mm incision was made ~25 mm posterior to the base of the pectoral fin on the left lateral side (i.e., approximately ⅓ of the total length of the eel) with a sterile 3.0 mm microsurgical scalpel (15° blade; Beaver Visitec, Waltham, Mass.). The transmission devices were then inserted posteriorly into the body cavity by hand. The tagging procedure took less than 60 sec per eel, after which the eels were placed into recovery buckets with fresh aerated river water at 16° C., then transferred to segregated holding troughs (300 L) with the same environmental conditions as the holding tanks. Juvenile American eels implanted with dummy transmission devices were shown to have similar swimming performances as those that were not tagged.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An acoustic transmission device comprising:
   a body;
   a transducer within the body which is configured to convert a plurality of electrical signals into a plurality of data transmissions which are transmitted externally of the body and an organism associated with the acoustic transmission device;
   a plurality of circuit components within the body which are configured to use electrical energy from a power source to generate the plurality of electrical signals which are provided to the transducer; and
   wherein the transducer defines an internal volume and an entirety of at least one of the plurality of circuit components is provided within the internal volume defined by the transducer.

2. The acoustic transmission device of claim 1 further comprising a sensor configured to generate environment data regarding an environment of the acoustic transmission device and the plurality of data transmissions include the environment data.

3. The acoustic transmission device of claim 1 wherein the transducer is configured to transmit the plurality of data transmissions externally of the body in a plurality of separate transmissions.

4. The acoustic transmission device of claim 1 further comprising the power source, and wherein the at least one of the circuit components comprises energy storage circuitry configured to store the electrical energy for the plurality of electrical signals.

5. The acoustic transmission device of claim 4 wherein the at least one of the circuit components is a capacitor.

6. The acoustic transmission device of claim 1 wherein the plurality of circuit components include control circuitry configured to use the electrical energy from the power source to generate the plurality of electrical signals.

7. The acoustic transmission device of claim 6 wherein the control circuitry is a microcontroller and a plurality of pins of the microcontroller are directly electrically connected via respective ones of a plurality of electrical connections with the transducer and the pins of the microcontroller provide the plurality of electrical signals directly to the transducer via the electrical connections.

8. The acoustic transmission device of claim 6 wherein the control circuitry is a microcontroller and a plurality of first pins of the microcontroller are coupled with the transducer at a first location adjacent to a first end of the transducer and a plurality of second pins of the microcontroller are coupled with the transducer at a second location adjacent to a second end of the transducer.

9. The acoustic transmission device of claim 8 wherein the first pins of the microcontroller provide the electrical signals in parallel to a single connection pad which is coupled with the transducer at the first location.

10. The acoustic transmission device of claim 6 wherein the plurality of circuit components include an oscillator and the control circuitry is configured to selectively enable the oscillator at different moments in time to generate a timing reference clock which is used to calibrate the control circuitry.

11. The acoustic transmission device of claim 1 wherein the transducer comprises a cylindrical body having a length, and wherein the cylindrical body of the transducer is configured to resonate along its length to convert the plurality of electrical signals into the plurality of data transmissions.

12. The acoustic transmission device of claim 11 wherein the transducer includes first and second connection pads adjacent to opposite ends of the cylindrical body and which conduct the plurality of electrical signals with respect to the transducer.

13. The acoustic transmission device of claim 11 wherein the length of the cylindrical body of the transducer defines a resonant frequency of the transducer which corresponds to a desired frequency of the plurality of data transmissions.

14. The acoustic transmission device of claim 1 wherein the circuit components include a microcontroller and internal timers of the microcontroller are used as a reference clock to generate the plurality of electrical signals.

15. The acoustic transmission device of claim 1 wherein the body is configured to be injected inside of the organism.

16. The acoustic transmission device of claim 1 wherein plural leads of the at least one of the circuit components are provided within the internal volume defined by the transducer.

17. An acoustic transmission device comprising:
- a body;
- a transducer within the body which is configured to convert a plurality of electrical signals into a plurality of data transmissions which are transmitted externally of the body and an organism associated with the acoustic transmission device;
- a plurality of circuit components within the body which are configured to use electrical energy from a power source to generate the electrical signals which are provided to the transducer;
- wherein the transducer defines an internal volume and at least one of the circuit components is provided within the internal volume defined by the transducer; and
- wherein the transducer comprises a cylindrical body having a length, and wherein the cylindrical body of the transducer is configured to resonate along its length to convert the electrical signals into the data transmissions.

18. The acoustic transmission device of claim 17 wherein the transducer includes first and second connection pads adjacent to opposite ends of the cylindrical body and which conduct the electrical signals with respect to the transducer.

19. The acoustic transmission device of claim 17 wherein the length of the cylindrical body of the transducer defines a resonant frequency of the transducer which corresponds to a desired frequency of the data transmissions.

20. An acoustic transmission device comprising:
- a body;
- a transducer within the body which is configured to convert a plurality of electrical signals into a plurality of data transmissions which are transmitted externally of the body and an organism associated with the acoustic transmission device;
- a plurality of circuit components within the body which are configured to use electrical energy from a power source to generate the electrical signals which are provided to the transducer;
- wherein the transducer defines an internal volume and at least one of the circuit components is provided within the internal volume defined by the transducer; and
- wherein plural leads of the at least one of the circuit components are provided within the internal volume defined by the transducer.

\* \* \* \* \*